United States Patent
Roessler

(10) Patent No.: US 9,472,799 B2
(45) Date of Patent: Oct. 18, 2016

(54) SWITCH ARRANGEMENTS AND BATTERY ARRANGEMENTS

(71) Applicant: Infineon Technologies AG, Neubiberg (DE)

(72) Inventor: Werner Roessler, Neufahrn (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 901 days.

(21) Appl. No.: 13/662,619

(22) Filed: Oct. 29, 2012

(65) Prior Publication Data

US 2014/0118982 A1    May 1, 2014

(51) Int. Cl.

| H01H 19/64 | (2006.01) |
|---|---|
| H01H 31/10 | (2006.01) |
| H01H 33/52 | (2006.01) |
| H01H 33/59 | (2006.01) |
| H01H 47/00 | (2006.01) |
| H01H 85/46 | (2006.01) |
| H01M 2/34 | (2006.01) |
| H01M 10/42 | (2006.01) |
| H01M 10/44 | (2006.01) |
| H02J 7/00 | (2006.01) |

(52) U.S. Cl.
CPC ........... *H01M 2/34* (2013.01); *H01M 10/4207* (2013.01); *H01M 10/441* (2013.01); *H02J 7/0021* (2013.01); *H02J 7/0042* (2013.01); *Y02T 10/7055* (2013.01)

(58) Field of Classification Search
CPC .... H01M 2/34; H01M 10/441; H02J 7/0021; Y10T 307/74
See application file for complete search history.

(56) References Cited

U.S. PATENT DOCUMENTS

| 5,119,272 A * | 6/1992 | Ohyama | H05K 1/167 174/260 |
|---|---|---|---|
| 5,164,554 A * | 11/1992 | Ikunami | H01H 13/702 200/339 |
| 5,777,844 A * | 7/1998 | Kiefer | H05K 7/20854 165/80.3 |
| 6,111,328 A * | 8/2000 | Ota | H02M 7/003 307/125 |
| 2003/0206392 A1* | 11/2003 | Kawata | H05K 1/0203 361/631 |
| 2004/0223310 A1* | 11/2004 | Toyomura | H05K 1/0265 361/777 |

(Continued)

FOREIGN PATENT DOCUMENTS

| CN | 1790909 A | 6/2006 |
|---|---|---|
| CN | 101026254 A | 8/2007 |

(Continued)

*Primary Examiner* — Rexford Barnie
*Assistant Examiner* — Rasem Mourad
(74) *Attorney, Agent, or Firm* — Viering, Jentschura & Partner mbB

(57) ABSTRACT

A switch arrangement may include at least one carrier having a first side and a second side and a plurality of electrically conductive through connections extending from the first side to the second side; a first switch terminal on the first side; a second switch terminal on the second side; a plurality of electronic switching devices arranged on the first side, each electronic switching device comprising a first controlled terminal and a second controlled terminal; wherein each first controlled terminal is connected to the first switch terminal via a respective electrically conductive connection; wherein the electrically conductive connections have substantially the same length; and wherein each second controlled terminal is connected to a respective through connection to connect the second switch terminal.

24 Claims, 10 Drawing Sheets

(56) References Cited

U.S. PATENT DOCUMENTS

| | | |
|---|---|---|
| 2006/0022298 A1* | 2/2006 | Shiraishi ............ H01L 23/3107 257/509 |
| 2007/0206034 A1 | 9/2007 | Nakashima et al. |
| 2008/0136258 A1 | 6/2008 | Imai et al. |
| 2011/0101920 A1* | 5/2011 | Seo ..................... B60L 11/1861 320/127 |
| 2014/0111952 A1* | 4/2014 | Xu ........................... H05K 3/30 361/748 |

FOREIGN PATENT DOCUMENTS

| | | |
|---|---|---|
| CN | 102203996 A | 9/2011 |
| CN | 202231082 U | 5/2012 |
| CN | 102545853 A | 7/2012 |
| EP | 1137147 A2 | 9/2001 |
| JP | 2003023088 A | 1/2003 |
| WO | 2011057246 A1 | 5/2011 |
| WO | 2012028640 A2 | 3/2012 |

\* cited by examiner

SWITCH ARRANGEMENTS AND BATTERY ARRANGEMENTS

TECHNICAL FIELD

Various embodiments relate generally to switch arrangements and battery arrangements.

BACKGROUND

In order to securely switch voltages in the range of hundreds of volts, e.g. to securely disconnect a battery in an electric or hybrid vehicle, conventionally, air gap switches or relays are provided as main switches. However, air gap switches require a lot of space, are heavy, result in high costs, and are not always fully reliable.

Therefore, there has been an attempt to replace air gap switches or relays by semiconductor switches. In this case, a plurality of semiconductor switches are to be connected in parallel. This results in an addition of the possible currents and switching power.

Conventionally, in the case of parallel connections, the individual semiconductor switches may be screwed or clamped onto a cooling body next to each other in a row.

SUMMARY

A switch arrangement may include at least one carrier having a first side and a second side and a plurality of electrically conductive through connections extending from the first side to the second side; a first switch terminal on the first side; a second switch terminal on the second side; a plurality of electronic switching devices arranged on the first side, each electronic switching device comprising a first controlled terminal and a second controlled terminal; wherein each first controlled terminal is connected to the first switch terminal via a respective electrically conductive connection; wherein the electrically conductive connections have substantially the same length; and wherein each second controlled terminal is connected to a respective through connection to connect the second switch terminal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

As mentioned above, the conventional arrangement of semiconductor switches is next to each other in a row. Thus, the supply lines to the different semiconductor switches will have different lengths. This will result in different timing in the switching of the respective semiconductor switches.

As will be explained in more detail below, in various embodiments, an arrangement of a plurality of semiconductor switches is provided such that the supply lines or control lines (in other words the electrically conductive connections) between a common terminal and a respective controlled terminal of the various semiconductor switches have substantially the same length. Thus, the various semiconductor switches may be switched off substantially at the same time. This may increase the security of the switch arrangement, e.g. in applications with high voltages in the range of e.g. 48 V or even some hundreds (e.g. 400 V DC) of Volts.

Various embodiments illustratively provide a high degree of symmetry of the arranged semiconductor switches, in general of the arranged electronic switching devices.

Figure 1:
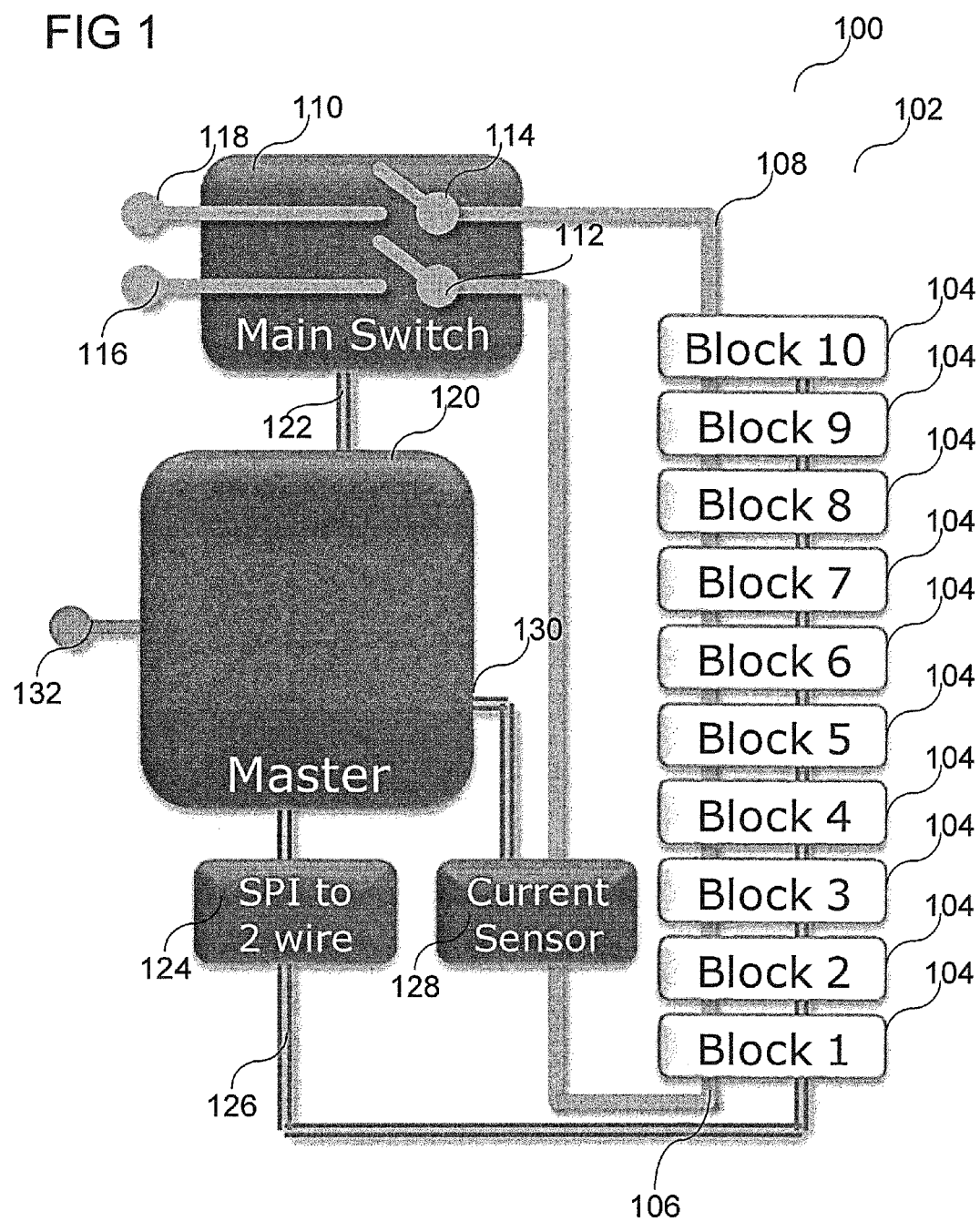
FIG. 1 shows a battery arrangement in accordance with various embodiments.

FIG. 1 shows a battery arrangement 100 in accordance with various embodiments. Although the switch arrangement in accordance with various embodiments will be described in the context of a battery arrangement, the switch arrangement may be used in other technical arrangements, such as e.g. in an inverter, e.g. in an inverter of a solar cell module. In further alternative embodiments, the switch arrangements may be provided in a smart grid application, in general, in an application using a DC voltage network providing several tens or hundreds of Volts. As a further alternative, the switch arrangement may be provided in a stationary battery buffer arrangement for storing energy gained via "green energy sources", e.g. via solar modules, wind turbines, and the like. In general the switch arrangement may be applied in any circuit or arrangement which requires a safe switching of high voltages (e.g in the range of tens to hundreds of Volts (DC)) and/or high currents ((e.g in the range of tens of Ampere (DC)).

The battery arrangement 100 may include a rechargeable battery system 102, which may include a plurality of rechargeable battery blocks 104 (in FIG. 1, ten rechargeable battery blocks 104 are shown, although in alternative embodiments, any other desired or suitable number of rechargeable battery blocks 104 may be provided), wherein each rechargeable battery block 104 may include one or more rechargeable battery cells and optionally a battery cell monitoring and balancing circuit (not shown). The rechargeable battery blocks 104 may be coupled with each other in series, starting from a first battery block 104 to a last battery block 104 of the series connection. The rechargeable battery system 102 may further include a first battery terminal 106 (providing a first electric potential) coupled to the first battery block 104 and a second battery terminal 108 coupled to the last battery block 104 (providing a second electric potential, which is different from the first electric potential). The battery arrangement 100 may further include a main switch arrangement 110 comprising a plurality of (e.g. two, three or more) main switches 112, 114. A first main switch 112 may be coupled to the first battery terminal 106 and the second main switch 114 may be coupled to the second battery terminal 108. Furthermore, the first main switch 112 may be coupled to a first main switch terminal 116 and the second main switch 114 may be coupled to a second main switch terminal 118. Thus, the main switch arrangement 110 may provide an all-pole disconnecting of the rechargeable battery system 102 from the main switch terminals 116, 118 of the battery arrangement 100.

In various embodiments, the first battery terminal 108 and the second battery terminal 110 may be coupled to a load device or a load circuit (not shown). In various embodiments, a high voltage and/or a high current may be provided at the battery terminals 108, 110 and (in case the main switch 110 is closed) at the main switch terminals 116, 118. A high (electric) voltage may be understood as including a DC voltage in the range from some tens (e.g. 30 V, 35 V, 40 V, 45 V, 48 V, 50 V, 55 V, 60 V or more) of Volts (V) to about some hundreds (e.g. 100 V, 150 V, 200 V, 250 V, 300 V, 350 V, 400 V, 450 V, 500 V, 550 V, 600 V or more) of Volts (V). A high (electric) current may be understood as including a DC current in the range from some tens (e.g. 30 A, 35 A, 40 A, 45 A, 50 A, 55 A, 60 A or more) of Ampere (A) to about some hundreds (e.g. 100 A, 150 A, 200 A, 250 A, 300 A, 350 A, 400 A, 450 A, 500 A, 550 A, 600 A or more) of Ampere (A). By way of example, a charge current which may be applied by a charging device to the main switch terminals 116, 118 and thus to the battery terminals 108, 110, to charge the rechargeable battery blocks 104, may be in the range from about 100 A (continuous charge current) to about 250 A (peak current, which may be applied for a few seconds) at a charge voltage in the range from about 200 V to about 420 V. In another example, the charge current may be in the range from about 150 A (continuous charge current) to about 350 A (peak current, which may be applied for a few seconds) at a charge voltage in the range from about 200 V to about 420 V.

The battery arrangement 100 may further include a master controller 120 (e.g. implemented as any kind of logic circuit, e.g. as hard-wired logic or as a programmable circuit such as a programmable processor (e.g. a microprocessor or a microcontroller)). The master controller 120 may be coupled to the main switch 110 via a connection line 122 (e.g. a cable or an electrically conductive conductor track on a printed circuit board (PCB)) and may be configured to send control signals to the main switch 110 to thereby control the opening and closing of the switches 112, 114 of the main switch 110. The master controller 120 may further include a Serial Peripheral Interface (SPI) 124 to connect to (in other words provide a communication connection with) the rechargeable battery blocks 104, and therein with, if applicable, the one or more battery cell monitoring and balancing circuits to control the charging and discharging behaviour of the battery cells of the battery blocks 104, e.g. via a single-wire 126 or a multi-wire connection 126 (e.g. a two-wire connection, a three-wire connection, or a connection having even more wires).

In various embodiments, the master controller 120 may be configured to provide at least one of the following functions:
  monitor the battery cell voltages;
  monitor the battery cell temperatures;
  determine the current provided by the battery cells and/or the battery blocks 104 and/or the rechargeable battery system 102;
  calculate the state of charge of the battery cells and/or the battery blocks 104 and/or the rechargeable battery system 102;
  calculate the state of health of the battery cells and/or the battery blocks 104 and/or the rechargeable battery system 102; and/or
  determine battery cell balancing decision(s).

In various embodiments, the optional battery cell monitoring and balancing circuit(s) may be configured to provide at least one of the following functions:
  measure the battery cell voltages;
  measure the battery cell temperatures; and/or
  execute the battery cell balancing.

Moreover, one or more current sensors (e.g. implemented as one or more hall sensors and/or as one or more shunt resistors or the like) 128 may be coupled between the battery blocks 104, e.g. the first battery terminal 106, and the first main switch 112, on the one hand, and between the battery blocks 104, e.g. the first battery terminal 106, and a sensor input 130 of the master controller 120, which may receive the sensor signals from the one or more current sensors 128. The master controller 120 may further include an external interface 132 configured to receive signals (e.g. control signals) from and/or provide signals (e.g. control signals and/or report signals) to a device outside the battery arrangement 100.

The battery arrangement 100 may be part of a vehicle, e.g. of an electric vehicle or a hybrid vehicle.

Taking these high voltages and/or currents into account, in a situation when the battery terminals 108, 110 should be separated (isolated) from the rechargeable battery blocks 104, the switches 112, 114 of the main switch 110 should be opened very fast. In a conventional main switch using a relay, for example, the switching time is rather slow.

Figure 2:
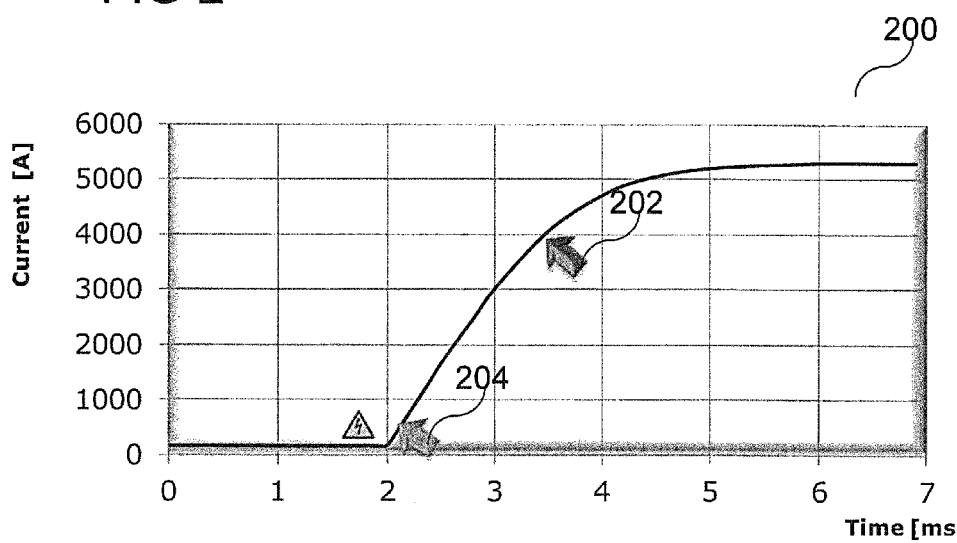
FIG. 2 shows a current/time diagram illustrating the current rise occurring after a short circuit in a battery arrangement in accordance with various embodiments.

FIG. 2 shows a current/time diagram 200 illustrating the current rise occurring after a short circuit in a battery arrangement in accordance with various embodiments. As shown in FIG. 2, there is a high rise of the current after a short circuit occurs within only a few microseconds. A conventional main switch usually has a switching time to be switched-off of at least 1.5 milliseconds (indicated in FIG. 2 by means of a first arrow 202), which would result in a high current load for the main switch in the range of about 4000 A or even more. This is a high stress for the main switch and may even destroy a conventional main switch based on relays, for example. In contrast thereto, a main switch based on semiconductor (power) switches may achieve a switching time to be switched-off in the range of only a few microseconds (indicated in FIG. 2 by means of a second arrow 204), which would result in a much lower current load for the main switch in the range of about a few hundreds Ampere only. In various embodiments, the main switch 110 may include a plurality of semiconductor switches implemented in the first main switch 112 and the second main switch 114, for example.

In various embodiments, the plurality of switches may be mounted on a carrier, and may be connected in parallel, in series, and/or anti-parallel.

In order to provide a sufficiently high switching performance of the switches, the plurality of switches (which may respectively be of the same electronic switching device type) may be connected in parallel, so that the currents and switching performance will be added up.

In a conventional arrangement of the plurality of switches, the switches are arranged next to each other on a carrier in a row, wherein the switches are screwed or clamped onto a cooling body. This will result in electrically conductive connections to connect the respective switches having different lengths. This will then result in different switching response times of the switches to a common activation/deactivation control signal, e.g. provided by the master controller 120, due to different parasitic components. Thus, in a conventional design, the switches will be switched off at different times. This in turn will result in some of the switches having to carry very high currents, even those of the switches that should have already been switched off, thereby putting a high stress on some of the switches.

Figure 3:
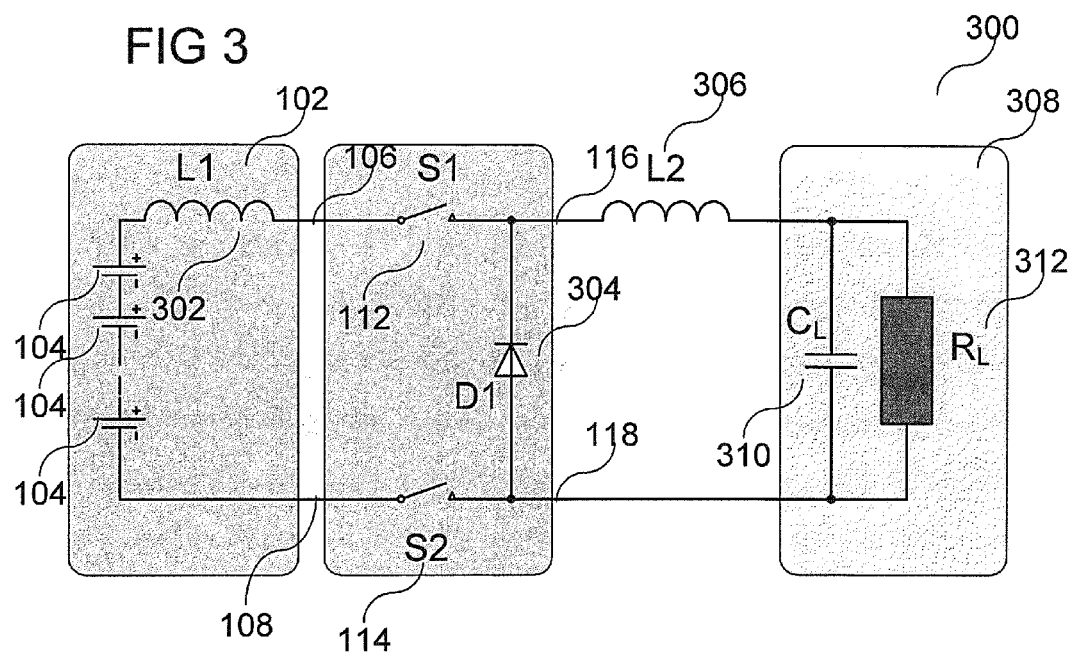
FIG. 3 shows a simplified equivalent circuit diagram of the battery arrangement of FIG. 1 in accordance with various embodiments.

FIG. 3 shows a simplified equivalent circuit diagram 300 of the battery arrangement of FIG. 1 in accordance with various embodiments. FIG. 3 shows the rechargeable battery system 102 including the battery blocks 104, additionally showing a parasitic inductor L1 302 of the rechargeable battery system 102, which may be e.g. 0.5 µH per battery cell of the battery blocks 104, and which may in addition take into account the series wiring between the battery cells. Furthermore, the main switch 110 including the first and second main switches 112, 114, may further include a free-running diode 304 connected between the first main switch 112 and the second main switch 114 downstream the rechargeable battery system 102. Furthermore, in FIG. 3, an inverter 308 is shown as one implementation of an external load device coupled to the main switch terminals 116, 118. The inverter may be coupled to the main switch terminals 116, 118 e.g. by means of a cable, indicated in FIG. 3 by a cable inductor L2 306 (which may be in the range of more than about 50 µH, for example). Furthermore, a DC (direct current) link capacitor CL 310 is shown as well as a load resistor 312 of the inverter 308.

In order to achieve sufficient current carrying performance for the main switches 112, 114, each of them may include a plurality of electronic switching devices. Various implementations of a main switch 112, 114, in general of a switch arrangement 400, will be described in more detail below.

FIG. 4 shows a top view of a switch arrangement 400 in accordance with various embodiments. Furthermore, FIG. 4 also shows a rear side (bottom) view of the switch arrangement, wherein the elements arranged on the rear side are shown by means of dashed lines.

The switch arrangement 400 may include at least one carrier 402 having a first side (e.g. a front side) 404, which may also be referred to as a first main side, and a second side (e.g. a back side or rear side) 406, which may also be referred to as a second main side, and a plurality of electrically conductive through connections (e.g. a plurality of through holes) extending from the first side 404 to the second side 406. The switch arrangement 400 may further include a first switch terminal 408 on the first side 404. The first switch terminal 408 may be implemented as a screw or a bolt, for example, and may further include a metal surface covering at least some portions of the front side 404 of the carrier 402 so that electronic switching devices, which will be described in more detail below, can be electrically coupled to the first switch terminal 408. The first switch terminal 408 may be configured to receive a first electric potential. In various embodiments, the first switch terminal 408 may be a terminal receiving a drain potential (in alternative embodiments, a terminal receiving a source potential). Furthermore, the switch arrangement 400 may include a second switch terminal 410 on the second side 406. The second switch terminal 410 may be configured to receive a second electric potential. In various embodiments, the second switch terminal 410 may be a terminal also receiving a drain potential (in alternative embodiments, a terminal receiving a source potential). The first switch terminal 408 and the second switch terminal 410 are electrically insulated from each other. The first switch terminal 408 may be arranged in a center region on the first side 404 of the carrier 402 and the second switch terminal 410 may be arranged in a center region on the second side 406 of the carrier 402. The carrier 402 (which may be a printed circuit board (PCB)) and may have a size of about (1 cm to 10 cm, e.g. 2 cm to 5 cm) (width)*about (1 cm to 20 cm, e.g. 5 cm to 10 cm) (length)*about (3 cm to 5 cm, e.g. 3.5 cm to 4.5 cm) (thickness). The carrier 402 may be a so called Waterboard PCB of the company Schweitzer or any other suitable carrier.

The first switch terminal 408 and the second switch terminal 410 may be surrounded by a plurality of electronic switching devices 412 arranged on the first side 404, wherein each electronic switching device 412 may include a first controlled terminal 414 (e.g. a drain terminal 414) and a second controlled terminal 416 (e.g. a source terminal 416). In various embodiments, the first controlled terminals 414 of the electronic switching devices 412 may be arranged around the first switch terminal 408 and may be connected to the first switch terminal 408 via a respective electrically conductive connection 418, as will be described in more detail below. Furthermore, in various embodiments, the first controlled terminals 424 of the further electronic switching devices 422 may be arranged around the second switch terminal 410 and may be connected to the second switch terminal 410 via a respective further electrically conductive connection 430, as will be described in more detail below.

The plurality of electronic switching devices 412 may be arranged on the first side 404 along a polygon circumferential line, wherein the first switch terminal 408 may be arranged within the polygon. In a similar manner, the plurality of further electronic switching devices 422 may be arranged on the second side 406 along a polygon circumferential line, wherein the second switch terminal 410 may be arranged within the polygon. The polygon(s) may be a triangle, a rectangle, a pentagon, a hexagon, a heptagon, an octagon or a polygon with a higher number of edges and corners.

Figure 4A:
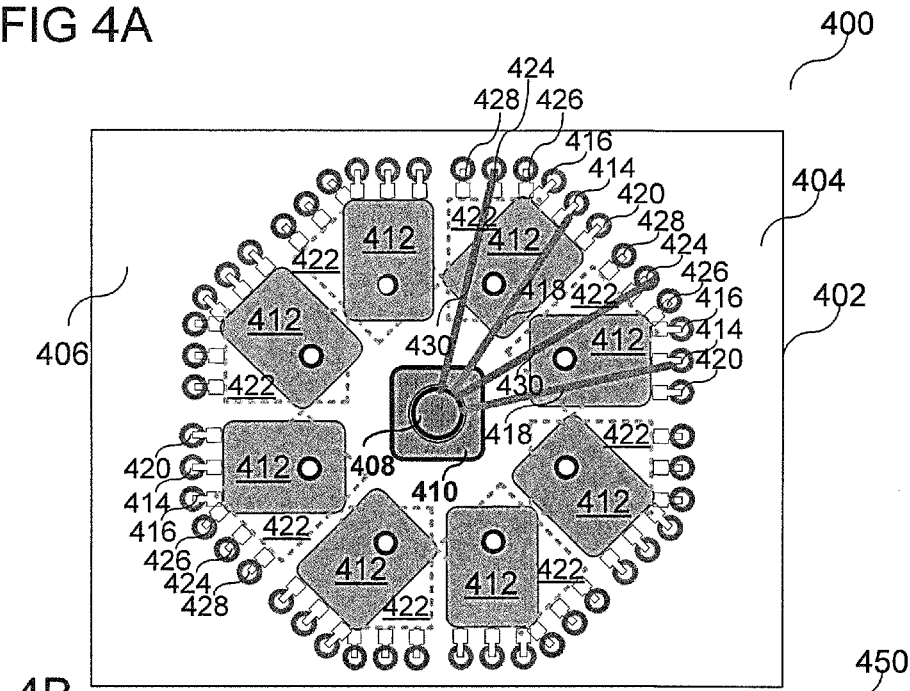
FIG. 4A shows a top view of a switch arrangement in accordance with various embodiments.

In the implementation shown in FIG. 4A, eight electronic switching devices 412 may be provided on the first side 404, although any other number of electronic switching devices 412 may be provided, e.g. an even number (alternatively an odd number) of electronic switching devices 412. The electronic switching devices 412 may be semiconductor switching devices 412 and may include one or more field effect transistors (e.g. one or more metal oxide semiconductor field effect transistors (MOSFETS)), e.g. one or more power field effect transistors (e.g. one or more power MOSFETS). As an alternative, the semiconductor switching devices 412 may include one or more bipolar transistors (e.g. one or more insulated gate bipolar transistors (IGBTs)). As a further alternative, the semiconductor switching devices 412 may include one or more thyristors. In various embodiments, the electronic switching devices 412 may be packaged switching devices (also referred to as integrated circuits) or as bare dies.

Each first controlled terminal 414 (e.g. drain terminal 414) may be connected to the first switch terminal 408 via a respective electrically conductive connection 418. Furthermore, each electronic switching device 412 may include a control terminal 420 (e.g. a gate terminal 420). The electrically conductive connections 418 may have substantially the same length. In various implementations, the lengths of the electrically conductive connections 418 may differ from each other by only a few millimeters or a few hundred micrometers or even less. In various implementations, the lengths of the electrically conductive connections 418 may differ from the longest electrically conductive connection 418 by only a few percent, e.g. by only 10% at maximum from the longest electrically conductive connection 418, e.g. by only 5% at maximum, e.g. by only 3% at maximum, e.g. by only 1% at maximum, or even less.

Each second controlled terminal 416 may be connected to a respective through connection (e.g. through hole) to connect (directly or indirectly, e.g. via another electronic switching device, which may be arranged on the second side 406) the second switch terminal 410.

Thus, in various embodiments, the electronic switching devices 412 may only be provided on one side 404, 406 of the carrier 402, e.g. the first side 404 of the carrier 402 (in alternative embodiments, they may also be arranged only on the second side 406 of the carrier 402).

In various embodiments, however, a plurality of further electronic switching devices 422 may additionally be provided, which may be arranged on the second side 406 of the carrier 402, in general on the side of the carrier opposite the side on which the plurality of electronic switching devices 412 is arranged. The further electronic switching devices may be of a similar type as described above for the electronic switching devices 412. Thus, in various embodiments, each further electronic switching device 422 may include a first controlled terminal 424 (e.g. a drain terminal 424) and a second controlled terminal 426 (e.g. a source terminal 426). Furthermore, each further electronic switching device 422 may include a control terminal 428 (e.g. a gate terminal 428).

In the implementation shown in FIG. 4A, eight further electronic switching devices 422 may be provided on the second side 404, although any other number of further electronic switching devices 422 may be provided, e.g. an even number (alternatively an odd number) of further electronic switching devices 422. The further electronic switching devices 422 are shown in FIG. 4A in dashed lines.

As shown in FIG. 4A, the further electronic switching devices 422 may be arranged relative to the electronic switching devices 412 such that in each case on electronic switching device 412 partially overlaps with a respective further electronic switching device 422. The may be arranged in an angle with each other such that the terminals 414, 416, 420 of the electronic switching devices 422 do not overlap (alternatively partially overlap or completely overlap) with the terminals 424, 426, 428. Illustratively, one respective electronic switching device 412 and one associated further electronic switching device 422 may be grouped to a switching device pair, which may be connected together between the first switch terminal 408 and the second switch terminal 410. In other words, one electronic switching device 412 of the electronic switching devices 412 on the first side 404 of the carrier 402 may be assigned to one electronic electronic switching device 422 of the electronic switching devices 422 on the second side 406 of the carrier 402 to thereby form a switching device pair. The electronic switching devices 412, 422 of a switching device pair may be connected to each other in series, in anti-series, or in parallel.

In the case of two switching devices 412, 422 of a respective pair being connected in series, the second controlled terminal (e.g. the source terminal) 416 of the electronic switching device 412 may be electrically connected (via one respective through connection, e.g. through hole) to the second controlled terminal (e.g. the source terminal) 426 of the further electronic switching device 422. This electrical connection or coupling may be provided by directly contacting the both terminals (e.g. 416, 426) with each other, wherein one or both of the terminals may be bent into (and, if applicable, through) the respective through connection, e.g. through hole and may be mechanically coupled together, e.g. by means of soldering. As an alternative, the through connections, e.g. through holes may be partially or completely filled with electrically conductive material (such as a metal, e.g. tungsten or copper or aluminum, or a metal alloy). In this case, each terminal (e.g. 416, 426) may then be coupled to the electrically conductive material to provide an electrical connection between the terminals (e.g. 416, 426) via the electrically conductive material. In this case, the electronic switching devices 412 and, if applicable, the further electronic switching devices 422, may be implemented as surface mounted devices (SMD).

Further, in the case of a series connection, the first terminal 424 of the respective further electronic switching device 422 may be electrically connected to the second switch terminal 410 via a respective further electrically conductive connection 430. In various implementations, the further electrically conductive connections 430 may have substantially the same length. In various implementations, the lengths of the further electrically conductive connections 430 may differ from each other by only a few millimeters or a few hundred micrometers or even less. In various implementations, the lengths of the further electrically conductive connections 430 may differ from the longest further electrically conductive connection 430 by only a few percent, e.g. by only 10% at maximum from the longest further electrically conductive connection 403, e.g. by only 5% at maximum, e.g. by only 3% at maximum, e.g. by only 1% at maximum, or even less.

In the case of a series connection, illustratively, there is provided a switchable series connection from the first switch terminal 408 to the second switch terminal 410 via a respective electrically conductive connection 418, a first terminal 414 (e.g. drain terminal) of a respective electronic switching device 412, a second terminal 416 (e.g. source terminal) of the electronic switching device 412, (if applicable, the electrically conductive material in the via or through connection, e.g. through hole), a second terminal 426 (e.g. source terminal) of the associated further electronic switching device 422, a first terminal 424 (e.g. drain terminal) of the associated further electronic switching device 422, and the respective further electrically conductive connection 430.

As shown in FIG. 4A, the terminals of the electronic switching devices 412 as well as the terminals of the further electronic switching devices 422 are directed away from the center region of the carrier 422, and thus away from the first switch terminal 408 and the second switch terminal 410, respectively.

By providing this arrangement of the similar lengths of the electrically conductive connections 418 and, if applicable, the further electrically conductive connections 430, it may be achieved that the electronic switching devices will be switched at the same time, thereby avoiding a high stress of only a few of the electronic switching devices due to an asynchronized switching. Furthermore, in the arrangement shown in FIG. 4A, the second controlled terminals (e.g. 416, 426) are arranged very near to each other next to their "common" through connection, e.g. through hole, thereby minimizing the distance between the second controlled terminals (e.g. 416, 426).

In various embodiments, the switch arrangement 400 may further include a control circuit (e.g. the master controller 120) configured to drive the control terminals (e.g. 420, 428) of the electronic switching devices 412 and/or the further electronic switching devices 422. In various embodiments, the control circuit may be configured to individually drive the control terminals (e.g. 420, 428) of the electronic switching devices 412 and/or the further electronic switching devices 422. In this case, the control circuit may include a plurality of driver circuits, wherein each driver circuit may be assigned to a respective electronic switching device 412 and/or to a respective further electronic switching device 422.

Figure 4B:
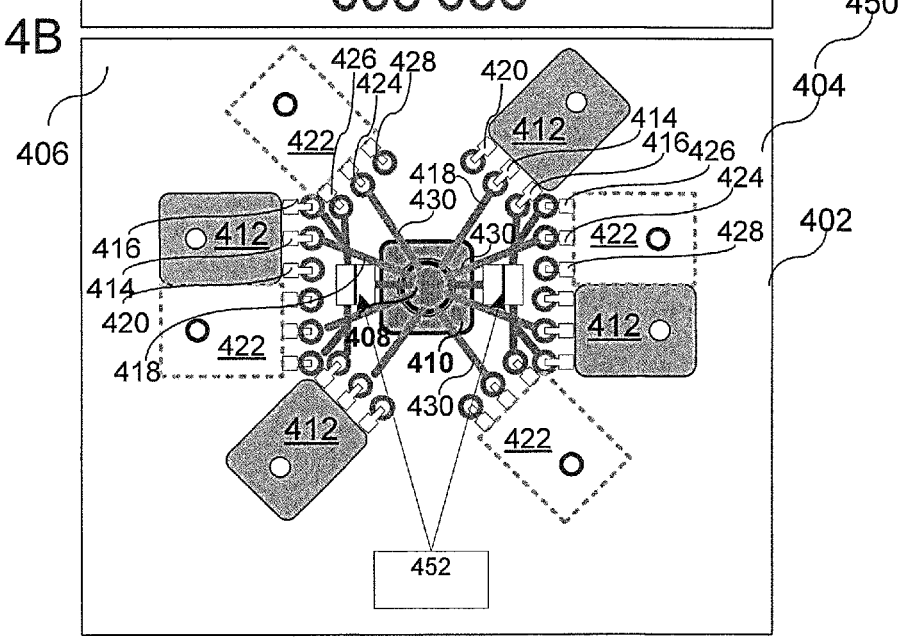
FIG. 4B shows a top view of a switch arrangement in accordance with various embodiments.

FIG. 4B shows a top view of a switch arrangement 450 in accordance with various embodiments. The switch arrangement 450 shown in FIG. 4B is similar with the switch arrangement 400 shown in FIG. 4A. Therefore, only the differences of the arrangements will be described in more detail below. With respect to the other features, it is referred to the description above of the switch arrangement 400 shown in FIG. 4A.

As shown in FIG. 4B, the terminals of the electronic switching devices 412 as well as the terminals of the further electronic switching devices 422 are directed towards the center region of the carrier 422, and thus directing to the first switch terminal 408 and the second switch terminal 410, respectively.

Furthermore, current sensors (e.g. implemented as Hall sensors and/or shunt resistors) 452 may be provided (it is to be noted that also in the arrangement 400 shown in FIG. 4A, current sensors may be provided) to measure the current flowing between respective second terminals (e.g. 416, 426) of the electronic switching devices 412 and the further electronic switching devices 422. In various embodiments, at least one current sensor 452 may be provided for each pair (which may also be referred to as group) of the electronic switching devices 412 and further electronic switching devices 422.

Figure 5A:
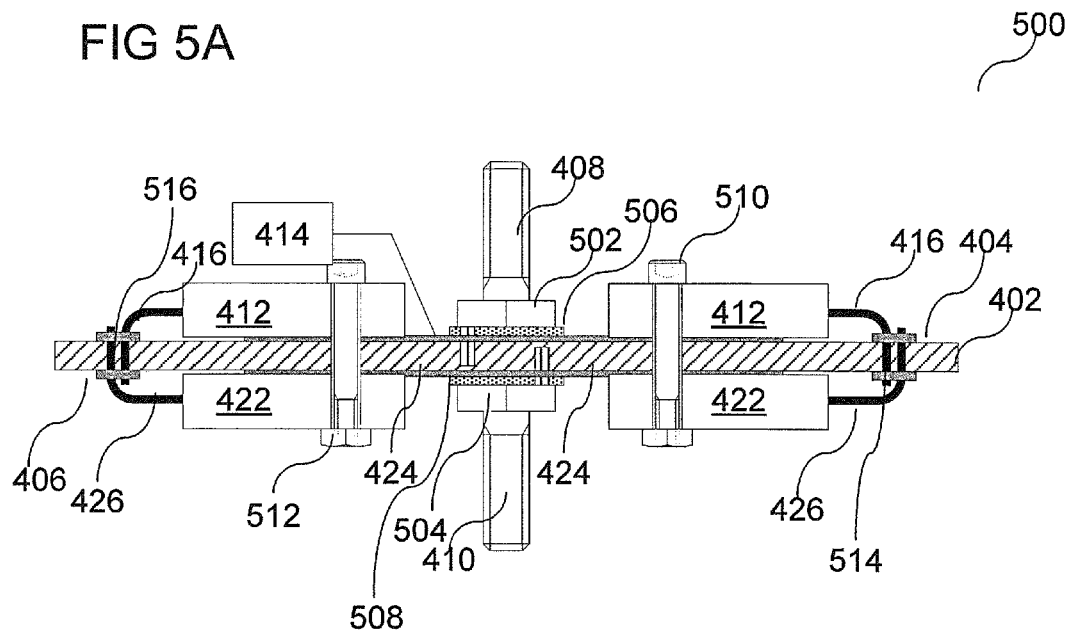
FIG. 5A shows a cross sectional view of a switch arrangement in accordance with various embodiments.

FIG. 5A shows a cross sectional view 500 of an implementation of the switch arrangement 400 of FIG. 4A or of the switch arrangement 450 of FIG. 4B in accordance with various embodiments.

As shown in FIG. 5A, each of the first switch terminal 408 and the second switch terminal 410 may include a respective press fit power clamp 502, 504, and a respective isolation ring 506, 508, between a first press fit power clamp 502 and the surface of the first side 404 of the carrier 402, and between a second press fit power clamp 504 and the surface of the second side 406 of the carrier 402. Furthermore, the electronic switching devices 412 and the further electronic switching devices 422 may be fixed to the carrier 402 by means of isolated screws 510, 512 or by and other suitable fixing means such as e.g. by means of clamping or adhesion. Furthermore, the through connections, e.g. through holes 514, 516 are shown in FIG. 5A, through which the second terminals (e.g. 416, 426) are connected with each other. The electronic switching devices 500 use an air cooling mechanism and may e.g. be capable to carry about 10 A per electronic switching device 412, 422.

Figure 5B:
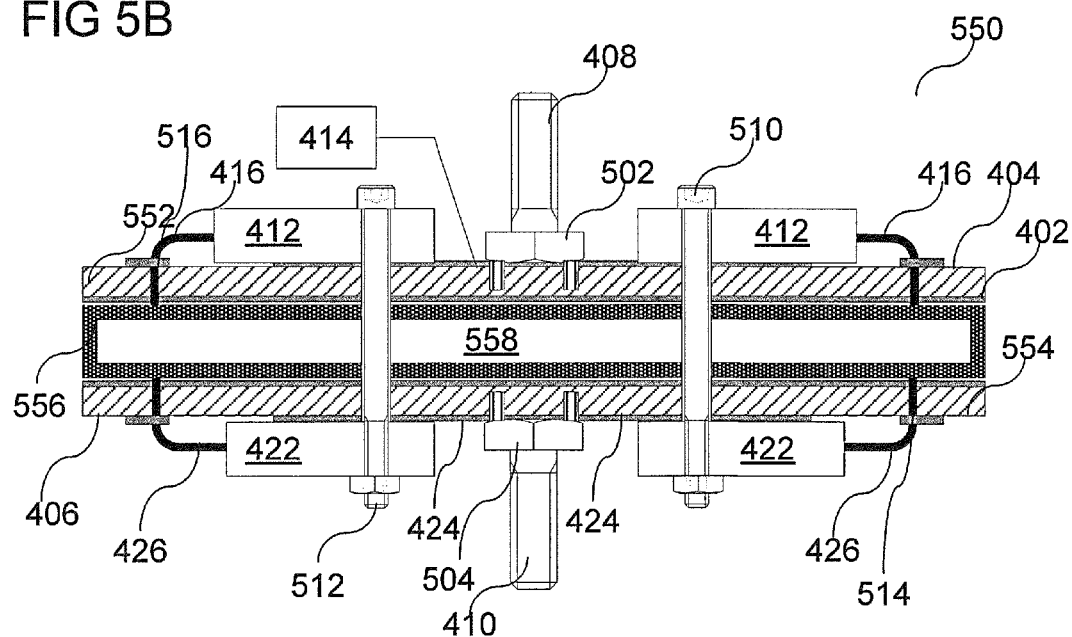
FIG. 5B shows a cross sectional view of a switch arrangement in accordance with various embodiments.

FIG. 5B shows a cross sectional view 550 of an implementation of the switch arrangement 400 of FIG. 4A or of the switch arrangement 450 of FIG. 4B in accordance with various embodiments. The switch arrangement 550 shown in FIG. 5B is similar to the switch arrangement 500 shown in FIG. 5A. Therefore, only the differences of the arrangements will be described in more detail below. With respect to the other features, it is referred to the description above of the switch arrangement 500 shown in FIG. 5A.

As shown in FIG. 5B, the carrier 402 may include two substrates 552, 554 and a metal container 556 including (in other words filled with) a cooling liquid 558 such as e.g. water or oil or another suitable cooling liquid. The metal container 556 may be sandwiched between the two substrates 552, 554. The electronic switching devices 550 use a liquid cooling mechanism and may e.g. be capable to carry about 25 A per electronic switching device.

Figure 6:
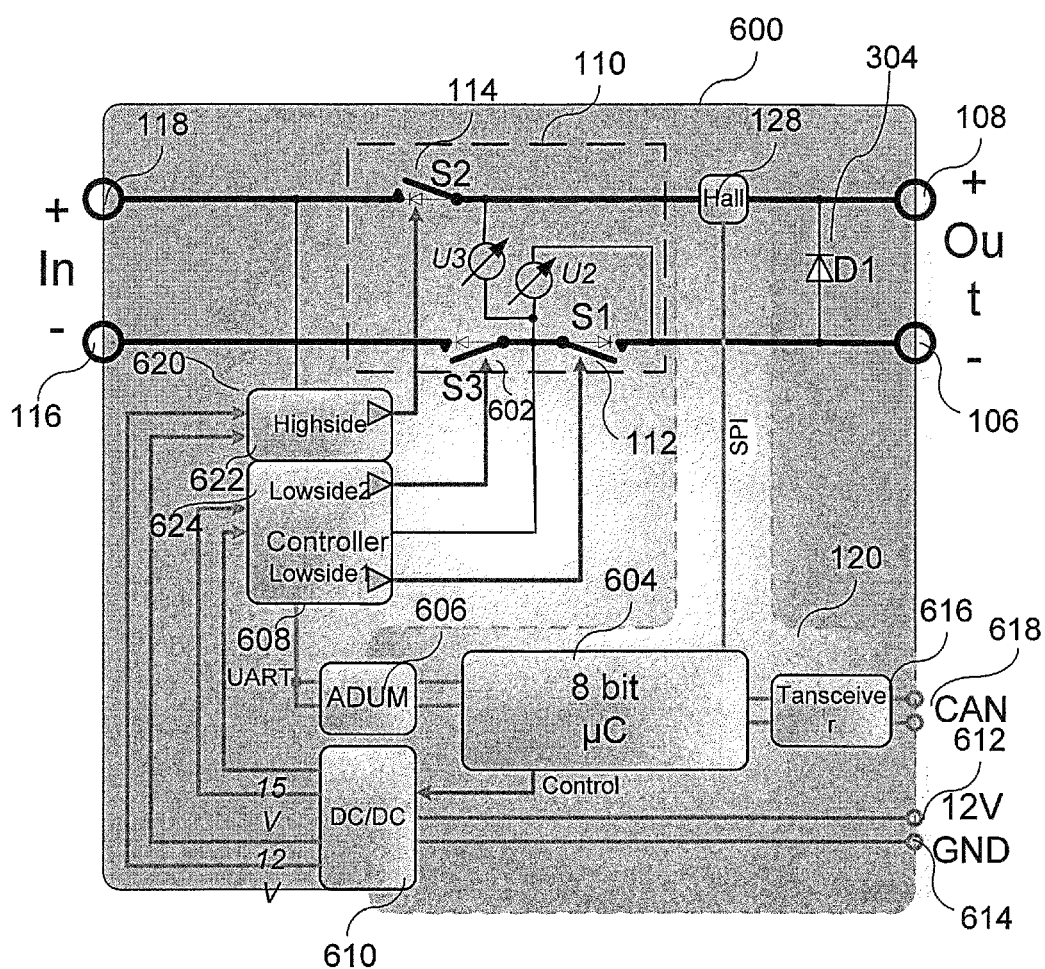
FIG. 6 shows an implementation of a portion of a battery arrangement in accordance with various embodiments.

FIG. 6 shows an implementation of a portion 600 of a battery arrangement in accordance with various embodiments. In the implementation of FIG. 6, a further main switch (in the following also referred to as third main switch) 602 may be provided, which may be coupled in series with the first main switch 112 and may be coupled between the first main terminal 116 and the first main switch 112. It is to be noted that all the main switches 112, 114, 602 may be implemented by a switch arrangement in accordance with various embodiments as described above and as will be described below.

Furthermore, the master controller 120 may include:
a multi-bit (e.g. 8 bit, alternatively 16 bit or 32 bit or 64 bit) microcontroller 604;
a dual-channel digital isolator (e.g. in the form of a transformer or an optocoupler) 606 coupled with two terminals of the microcontroller 604 on one side of the digital isolator 606, and with a first low side control circuit 608 on the other side of the digital isolator 606;
a direct current/direct current (DC/DC) converter 610 coupled with a control terminal of the microcontroller 604, wherein a first input terminal of the DC/DC converter 610 may be coupled with a first reference potential terminal (e.g. configured to receive a first reference potential of e.g. 12 V) 612, and a second input terminal of the DC/DC converter 610 may be coupled with a second reference potential terminal (e.g. configured to receive a second reference potential of e.g. ground potential) 614; the DC/DC converter 610 may include a first output terminal pair providing a first electric voltage (e.g. of 12 V) and a second output terminal pair providing a second electric voltage (e.g. of 15 V), which may be lower than the first electric voltage; and a transceiver 616 coupled to a CAN (controller area network) bus interface 618.

The portion 600 of the battery arrangement may further include a switch driver circuit 620. The switch control circuit 620 may include:

the first low side control circuit 608 configured to control the switching of the first main switch 112;

a high side control circuit 622 configured to control the switching of the second main switch 114, wherein inputs of the high side control circuit 622 are coupled with the first output terminal pair of the DC/DC converter 610; and a second low side control circuit 624 configured to control the switching of the third main switch 602, wherein inputs of the second low side control circuit 624 are coupled with the second output terminal pair of the DC/DC converter 610.

Figure 7:
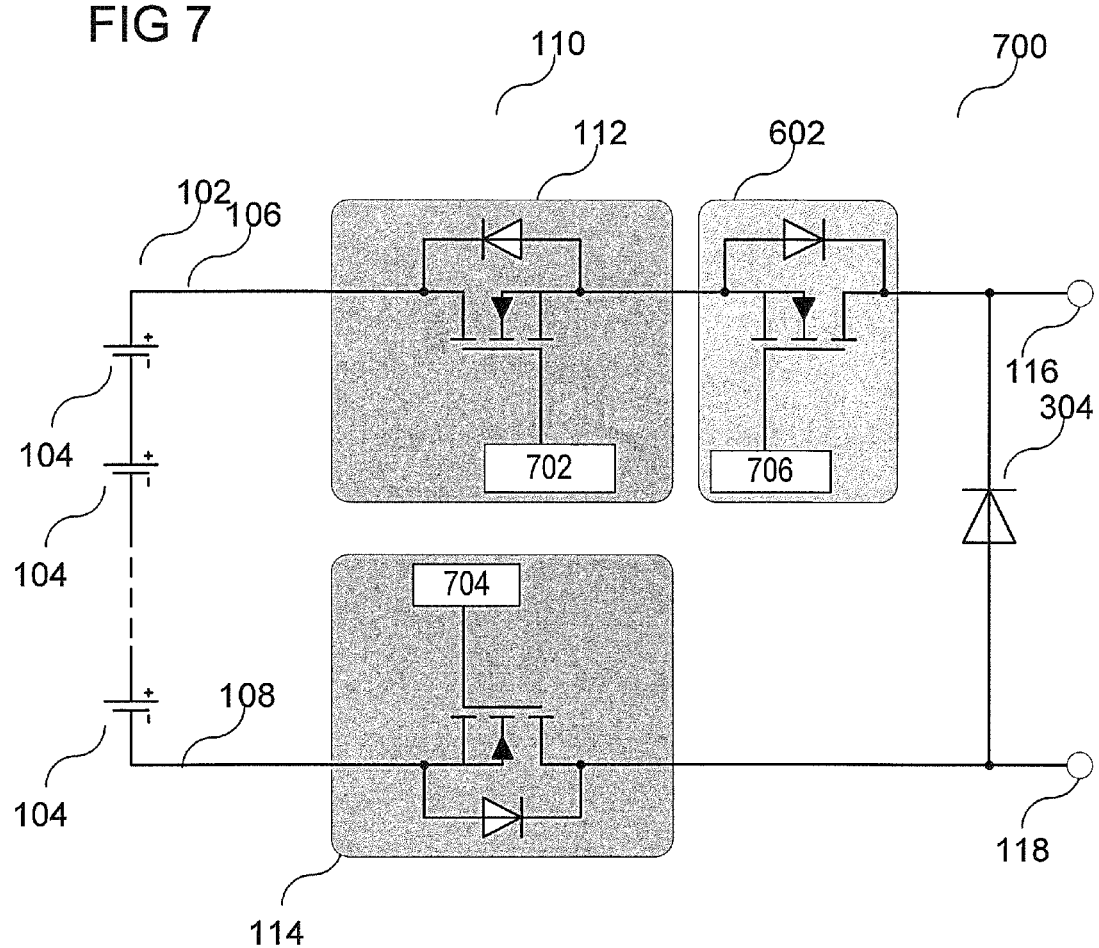
FIG. 7 shows an equivalent circuit of the implementation of the main switch in accordance with various embodiments.

FIG. 7 shows an equivalent circuit 700 of an implementation of the main switch 110 in accordance with various embodiments. As shown in FIG. 7, the first main switch 112 may be coupled with the first battery terminal 106 of the rechargeable battery system 102 on its one side and with the third main switch 602 on its other side. The third main switch 602 may be coupled between the first main switch 112 and the first main switch terminal 116. The second main switch 114 may be coupled between the second battery terminal 108 of the rechargeable battery system 102 and the second main switch terminal 118. Furthermore, each main switch 112, 114, 602 may include an individual separate driver circuit 702, 704, 706. By way of example, a first driver circuit 702 may be provided in or for the first main switch 112 and may be coupled to the control terminal of the switching device of the first main switch 112, e.g. implemented as a transistor, e.g. a field effect transistor (in this case, the first driver circuit 702 may be coupled to the gate terminal of the field effect transistor of the first main switch 112). Furthermore, a second driver circuit 704 may be provided in or for the second main switch 114 and may be coupled to the control terminal of the switching device of the second main switch 114, e.g. implemented as a transistor, e.g. a field effect transistor (in this case, the second driver circuit 704 may be coupled to the gate terminal of the field effect transistor of the second main switch 114). Moreover, a third driver circuit 706 may be provided in or for the third main switch 602 and may be coupled to the control terminal of the switching device of the third main switch 602, e.g. implemented as a transistor, e.g. a field effect transistor (in this case, the third driver circuit 706 may be coupled to the gate terminal of the field effect transistor of the third main switch 602).

In this implementation, the first main switch 112 may serve for a voltage disconnect of the voltage provided by the rechargeable battery system 102, for example. It may also serve for a (e.g. pulsed) precharging of the DC link (i.e. the DC link between the second second battery terminal 108 and the second main switch terminal 118), as will be described in more detail below. The second main switch 114 may serve for a redundant voltage disconnect of the voltage provided by the rechargeable battery system 102, for example. It may also serve for precharging the (analog) input capacitor (not shown). Furthermore, the third main switch 602 may serve to prevent from an overcharge in the case of a failure mode of the battery charger.

The implementation shown in FIG. 7, in which the first main switch 112 and the third main switch 602 are arranged in the high side portion, may be suitable for an application e.g. in a vehicle, in which the chassis of the vehicle is forming the ground potential.

Figure 8:
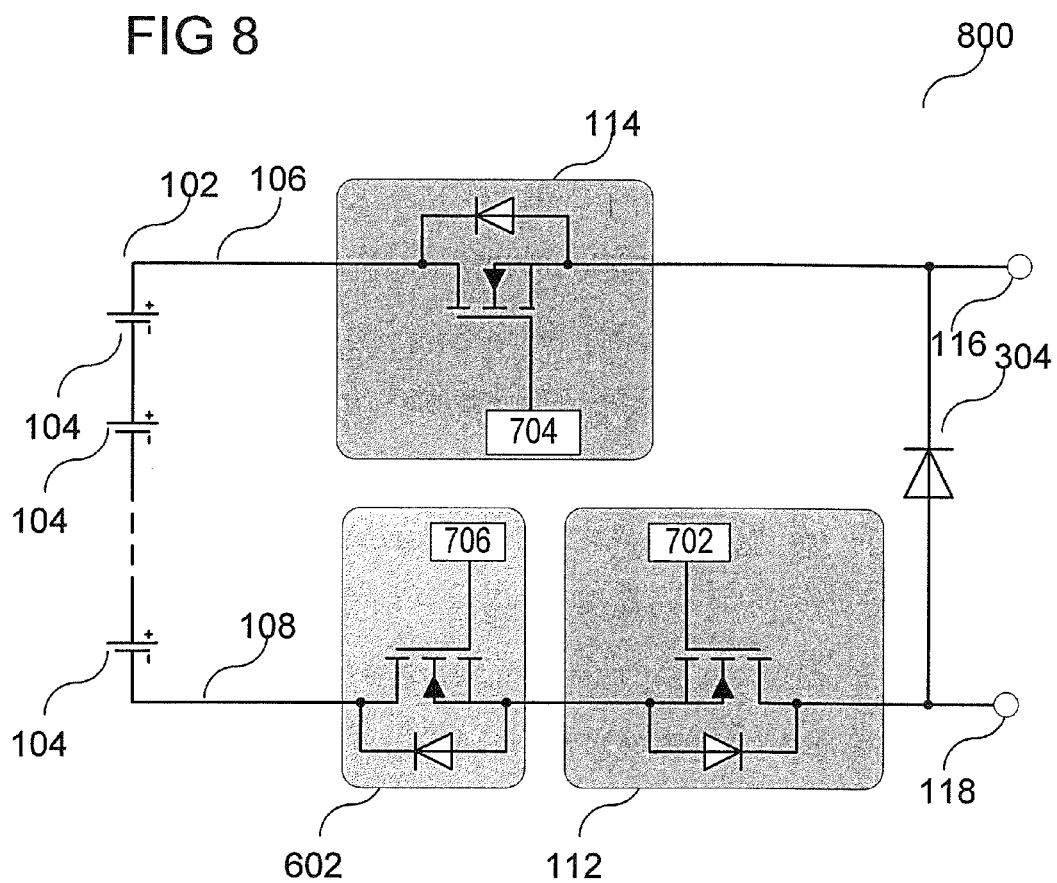
FIG. 8 shows an equivalent circuit of the implementation of the main switch in accordance with various embodiments.

However, an alternative implementation may provide the first main switch 112 and the third main switch 602 arranged in the low side portion, as shown in FIG. 8. This may be suitable in an application, in which a positive voltage measurement is desired, i.e. the potential of the driver circuit is negative.

FIG. 8 shows an equivalent circuit 800 of another implementation of the main switch 110 in accordance with various embodiments.

In this implementation, the second main switch 114 may be coupled between the first battery terminal 106 and the first main switch terminal 116. Furthermore, the third main switch 602 may be coupled with the second battery terminal 108 of the rechargeable battery system 102 on its one side and with the first main switch 112 on its other side. The first main switch 112 may be coupled between the third main switch 602 and the second main switch terminal 118. Furthermore, each main switch 112, 114, 602 may include an individual separate driver circuit 702, 704, 706. By way of example, a first driver circuit 702 may be provided in or for the first main switch 112 and may be coupled to the control terminal of the switching device of the first main switch 112, e.g. implemented as a transistor, e.g. a field effect transistor (in this case, the first driver circuit 702 may be coupled to the gate terminal of the field effect transistor of the first main switch 112). Furthermore, a second driver circuit 704 may be provided in or for the second main switch 114 and may be coupled to the control terminal of the switching device of the second main switch 114, e.g. implemented as a transistor, e.g. a field effect transistor (in this case, the second driver circuit 704 may be coupled to the gate terminal of the field effect transistor of the second main switch 114). Moreover, a third driver circuit 706 may be provided in or for the third main switch 602 and may be coupled to the control terminal of the switching device of the third main switch 602, e.g. implemented as a transistor, e.g. a field effect transistor (in this case, the third driver circuit 706 may be coupled to the gate terminal of the field effect transistor of the third main switch 602).

Figure 9:
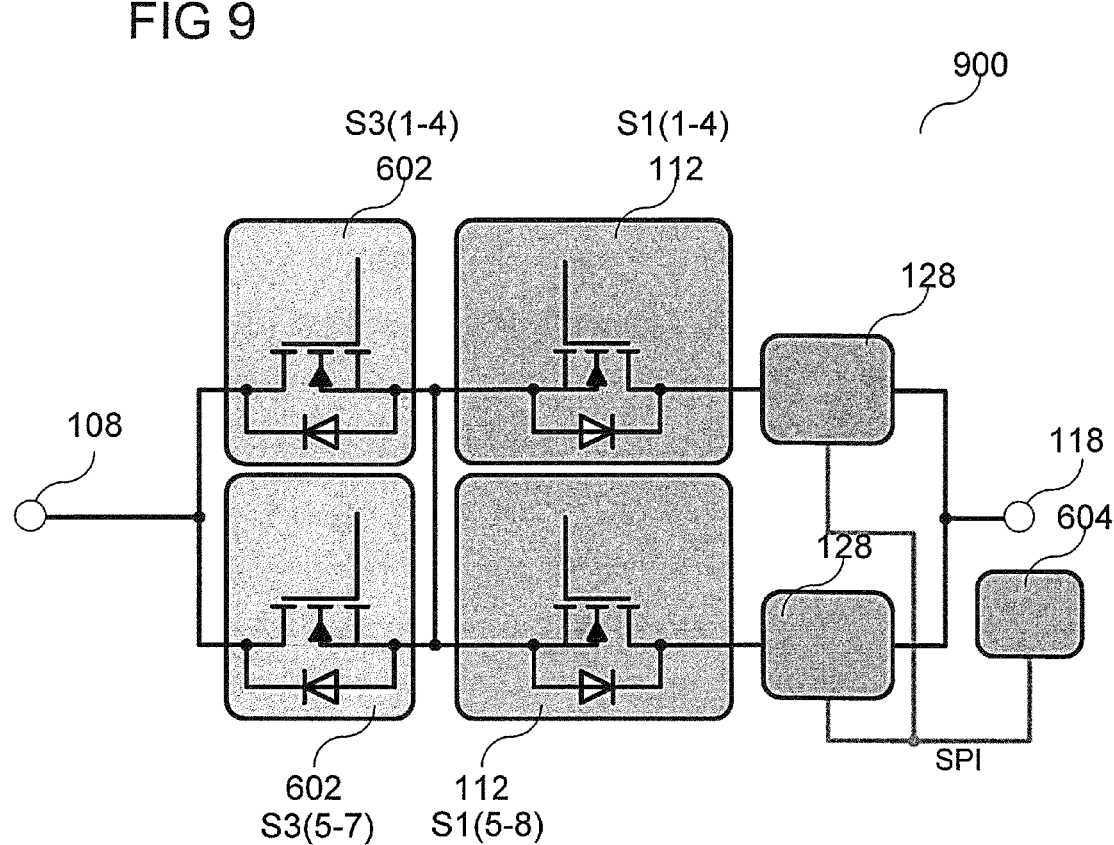
FIG. 9 shows a circuit diagram of the first main switch and the third main switch in accordance with various embodiments.

FIG. 9 shows a circuit diagram 900 of the first main switch 112 and the third main switch 602 in accordance with various embodiments. As shown in FIG. 9, one current sensor 128 (e.g. one hall sensor 128) may be provided for a plurality of but not all switching devices of the first main switch 112 and the third main switch 602. In various embodiments, a first hall sensor 128 may be provided for four switching devices (S1 1-4) 412, 422 of the first main switches 112 and for four switching devices (S3 1-4) 412, 422 of the third main switches 602, and a second hall sensor 128 may be provided for the other four switching devices (S1 5-8) 412, 422 of the first main switches 112 and for the other four switching devices (S3 5-8) 412, 422 of the third main switches 602 in case of eight switching devices 412, 422.

Figure 10:
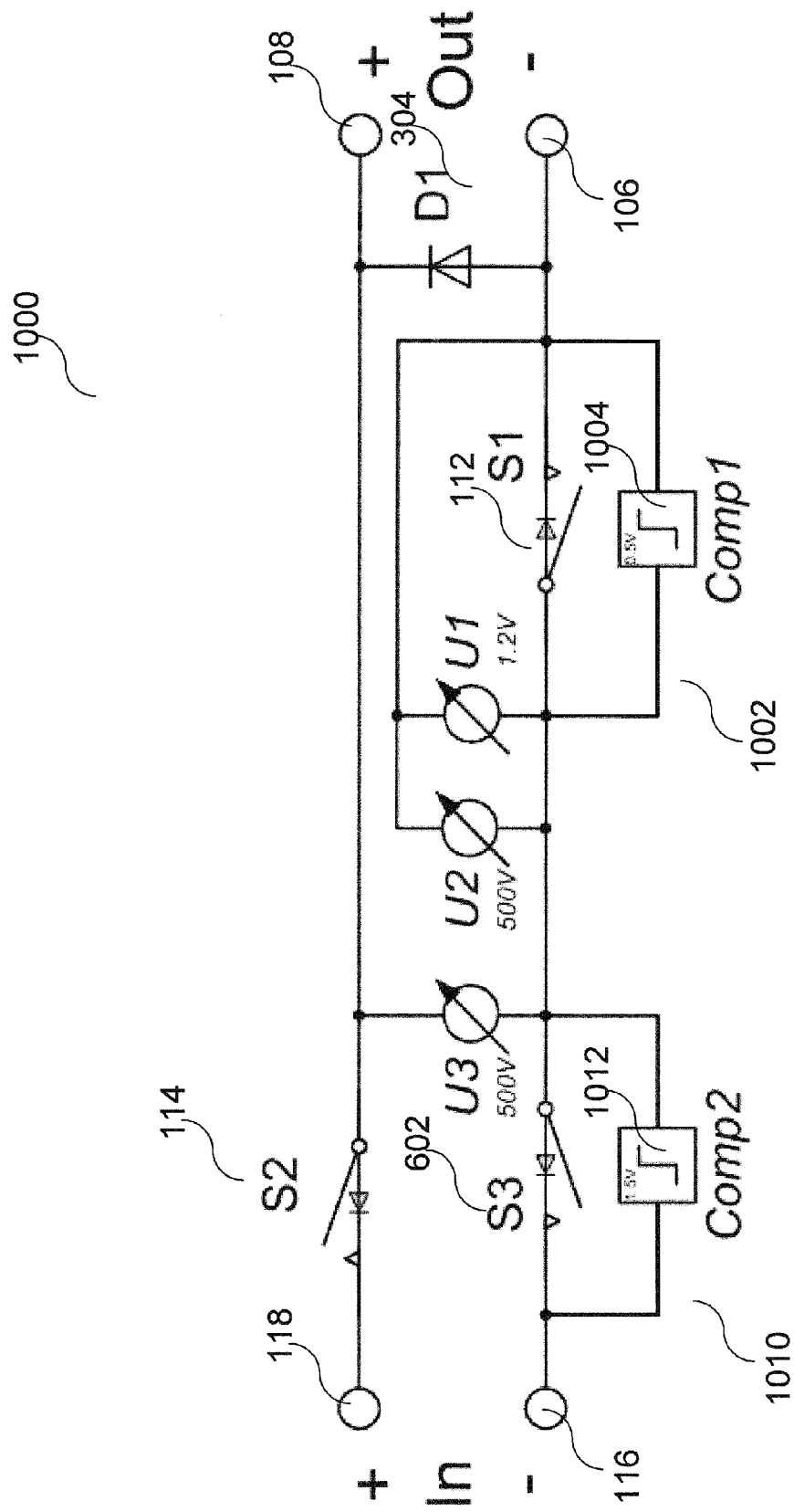
FIG. 10 shows a portion of a battery arrangement including a plurality of main switches in accordance with various embodiments.

As mentioned above, the first main switch 112 may serve for a (e.g. pulsed) precharging of the DC link in order to achieve a higher overcurrent threshold for the first main switch 112 and/or for the third main switch 602. FIG. 10 shows a portion 1000 of a battery arrangement including a plurality of main switches 112, 114, 602 in accordance with various embodiments. In various embodiments, a first precharge circuit 1002 may be provided for the first main switch 112 and a second precharge circuit 1010 may be provided for the third main switch 602, as will be described in more detail below. The first precharge circuit 1002 may include a first comparator 1004, which may be connected in parallel to the first main switch 112. Furthermore, the second precharge circuit 1010 may include a second comparator 1012, which may be connected in parallel to the third main switch 602.

Figure 11A:
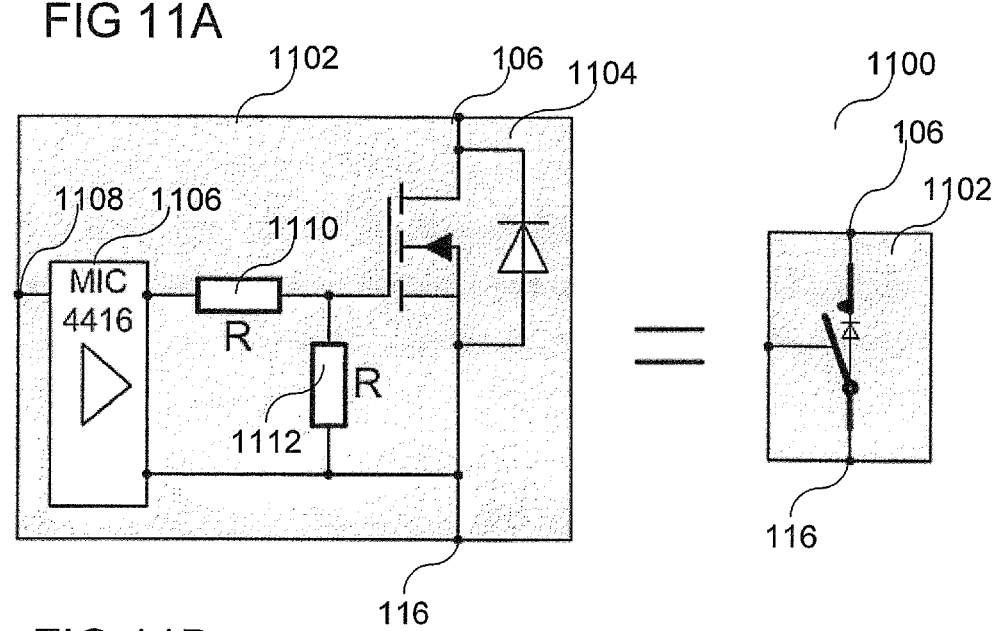
FIG. 11A shows a portion of a precharge circuit in accordance with various embodiments.

FIG. 11A shows a portion 1100 of a precharge circuit (e.g. the first precharge circuit 1002 or the third precharge circuit 1010) in accordance with various embodiments. As shown in FIG. 11A a first electronic switching device 412, 1102 including a portion of the first precharge circuit 1002) may include a transistor 1104, e.g. a power transistor 1104, as described above, and a circuit configured to provide a fast switching on and switching off of the transistor 1104. The circuit may include a driver circuit 1106 (e.g. an FET driver circuit 1106, e.g. a MOSFET driver circuit 1106, e.g. an MIC 4416 driver circuit), an input of which is coupled with a control input 1108 of the first precharge circuit 1002, a first output may be coupled to the control terminal (e.g. the gate) of the transistor 1104 via a first resistor 1110, and a second output may be coupled to the first main switch terminal 116 and, via a second resistor 1112 also to the control terminal (e.g. the gate) of the transistor 1104. Furthermore, the first main switch terminal 116 may be coupled to a first controlled terminal (e.g. the source or the drain) of the transistor 1104, and a second controlled terminal (e.g. the drain or the source) of the transistor 1104 may be coupled to the first battery terminal 106.

It should be noted that this additional driver circuit may only be provided in one or some (but not all) of the electronic switching devices 412, 422, 1102. This is illustrated in FIG. 11B, shows a portion 1150 of a precharge circuit (e.g. the first precharge circuit 1002 or the third precharge circuit 1010) in accordance with various embodiments.

Figure 11B:
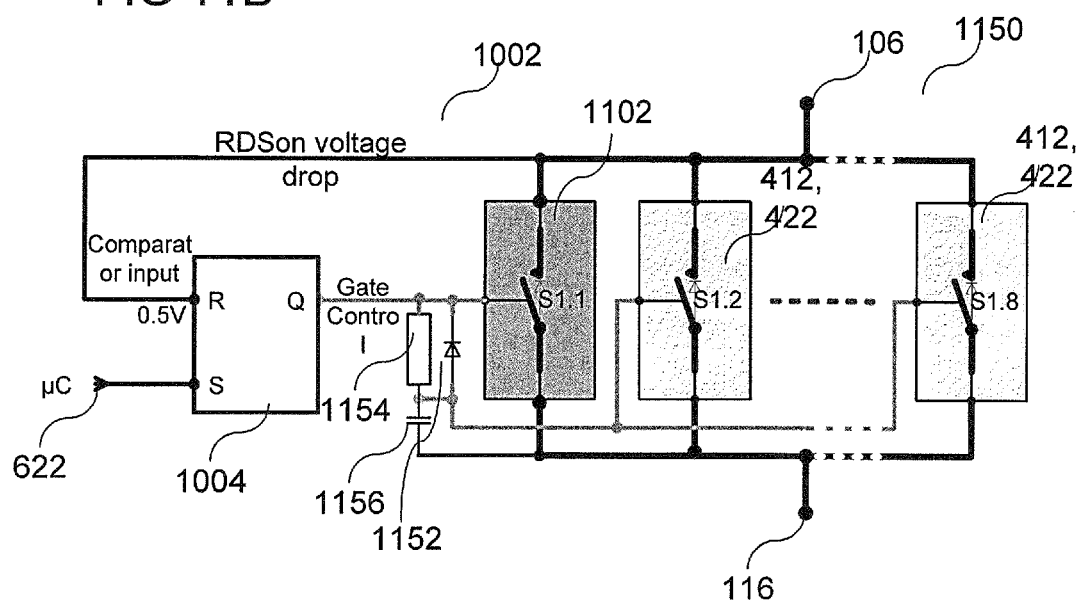
FIG. 11B shows a portion of a precharge circuit in accordance with various embodiments.

As shown in FIG. 11B, the other electronic switching devices 412, 422 may include the circuit as shown in and described with reference with FIG. 11A and thus may include the driver circuit as described with respect to the first electronic switching device 412, 1102 of FIG. 11A. The first precharge circuit 1002 may include the first comparator 1004, which may be implemented by an RS flipflop. The Reset input R of the first comparator 1004 may be coupled with the first battery terminal 106, the Set input S of the first comparator 1004 may be coupled with the high side control circuit 622, and the output Q of the first comparator 1004 may be coupled with the control inputs of the electronic switching devices 412, 422. In various embodiments, the output Q of the first comparator 1004 may directly be coupled with the control input of the first precharge circuit 1002 and thus with the input of the driver circuit 1106. Furthermore, the output Q of the first comparator 1004 may be coupled with the control inputs of the other electronic switching devices 412, 422, via a parallel connection of a diode 1152 and a resistor 1154, thereby delaying the control signal provided at the output Q of the first comparator 1004 to the control inputs of the other electronic switching devices 412, 422. Furthermore, a capacitor 1156 may be connected between the parallel connection and the first main switch terminal 116.

Thus, the first precharge circuit 1002 may provide a fast switching on and switching off of the first electronic switching device 412, 1102, and a fast switching off, but only a slow switching on (delayed by the parallel connection described above) of the other electronic switching devices 412, 422.

In various embodiments, the first electronic switching device 412 and the other electronic switching devices 412, 422 may be controlled by means of a plurality of individual control signals, which may be provided by the first comparator 1004 or by another circuit, While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A switch arrangement, comprising: at least one carrier having a first side and a second side and a plurality of electrically conductive through connections extending from the first side to the second side; a first switch terminal on the first side; a second switch terminal on the second side; a plurality of electronic switching devices arranged on the first side, each electronic switching device comprising a first controlled terminal and a second controlled terminal; wherein each first controlled terminal is connected to the first switch terminal via a respective electrically conductive connection; wherein the electrically conductive connections have substantially the same length; wherein each second controlled terminal is connected to a respective through connection to connect the second switch terminal; and wherein at least two second controlled terminals are connected with each other through the respective through connection; and a plurality of further electronic switching devices arranged on the second side, each further electronic switching device comprising a first controlled terminal and a second controlled terminal; wherein each first controlled terminal is connected to the second switch terminal via a respective further electrically conductive connection, wherein the further electrically conductive connections have substantially the same length.

2. The switch arrangement of claim 1,
wherein one switching device of the switching devices on the first side is assigned to one switching device of the switching devices on the second side to thereby form a switching device pair.

3. The switch arrangement of claim 1, further comprising:
a control circuit configured to drive the control terminals of the electronic switching devices.

4. The switch arrangement of claim 3,
wherein the control circuit is configured to individually drive the control terminals of the electronic switching devices.

5. The switch arrangement of claim 4,
wherein the control circuit comprises a plurality of driver circuits;
wherein each driver circuit is assigned to a respective electronic switching device.

6. The switch arrangement of claim 1, further comprising:
at least one current sensor connected between the first switch terminal and the second switch terminal.

7. The switch arrangement of claim 6,
wherein the at least one current sensor comprises at least one current sensor provided for each group of electronic switching devices.

8. The switch arrangement of claim 1,
wherein the plurality of electronic switching devices comprises at least one of at least one transistor and at least one thyristor.

9. The switch arrangement of claim 1,
wherein the plurality of electrically conductive through connections comprises a plurality of through holes extending from the first side to the second side.

10. A battery arrangement, comprising: at least one battery; and a switch arrangement, comprising: at least one carrier having a first side and a second side and a plurality of electrically conductive through connections extending from the first side to the second side; a first switch terminal on the first side; a second switch terminal on the second side; a plurality of electronic switching devices arranged on the first side, each electronic switching device comprising a first controlled terminal and a second controlled terminal; wherein each first controlled terminal is connected to the first switch terminal via a respective electrically conductive connection; wherein the electrically conductive connections have substantially the same length; and wherein each second controlled terminal is connected to a respective through connection to connect the second switch terminal; wherein at least two second controlled terminals are connected with each other through the respective through connection; and a plurality of further electronic switching devices arranged on the second side, each further electronic switching device comprising a first controlled terminal and a second controlled terminal; wherein each first controlled terminal is connected to the second switch terminal via a respective further electrically conductive connection, wherein the further electrically conductive connections have substantially the same length.

11. A switch arrangement, comprising: at least one carrier having a first main side and a second main side and a plurality of electrically conductive through connections from the first main side to the second main side; first switch terminal on the first main side; second switch terminal on the second main side; a plurality of electronic switching devices arranged on the first main side, each electronic switching device comprising a first controlled terminal and a second controlled terminal; wherein the first controlled terminals are arranged around the first switch terminal and are connected to the first switch terminal via a respective electrically conductive connection; and wherein each second controlled terminal is connected to a respective through connection to connect the second switch terminal; wherein at least two second controlled terminals are connected with each other through the respective through connection; and a plurality of further electronic switching devices arranged on the second main side, each further electronic switching device comprising a first controlled terminal and a second controlled terminal; wherein each first controlled terminal is connected to the second switch terminal via a respective further electrically conductive connection, wherein the first controlled terminals are arranged around the second switch terminal and are connected to the second switch terminal via a respective electrically conductive connection.

12. The switch arrangement of claim 11,
wherein the plurality of electronic switching devices arranged on the first main side along a polygon circumferential line;
wherein the first switch terminal is arranged within the polygon.

13. The switch arrangement of claim 11,
wherein the plurality of further electronic switching devices are arranged on the second main side along a polygon circumferential line;
wherein the second switch terminal is arranged within the polygon.

14. The switch arrangement of claim 13,
wherein one switching device of the switching devices on the first main side is assigned to one switching device of the switching devices on the second main side to thereby form a switching device pair.

15. The switch arrangement of claim 14,
wherein the switching devices of a switching device pair are connected to each other in accordance with one of the following connections:
in series;
anti-series; and
parallel.

16. The switch arrangement of claim 11, further comprising:
a control circuit configured to drive the control terminals of the electronic switching devices.

17. The switch arrangement of claim 16,
wherein the control circuit is configured to individually drive the control terminals of the electronic switching devices.

18. The switch arrangement of claim 17,
wherein the control circuit comprises a plurality of driver circuits;
wherein each driver circuit is assigned to a respective electronic switching device.

19. The switch arrangement of claim 11, further comprising:
at least one current sensor connected between the first switch terminal and the second switch terminal.

20. The switch arrangement of claim 19,
wherein the at least one current sensor comprises at least one current sensor provided for each group of electronic switching devices.

21. The switch arrangement of claim 11,
wherein the plurality of electronic switching devices comprises at least one of at least one transistor and at least one thyristor.

22. The switch arrangement of claim 11,
wherein the plurality of electronic switching devices comprises at least one transistor; and
wherein the at least one transistor comprises at least one of at least one field effect transistor and at least one bipolar transistor.

23. The switch arrangement of claim 22,
wherein the at least one transistor comprises at least one of at least one power field effect transistor and at least one insulated gate bipolar transistor.

24. A battery arrangement, comprising: at least one battery; and a switch arrangement, comprising: at least one carrier having a first main side and a second main side and a plurality of electrically conductive through connections from the first main side to the second main side; first switch terminal on the first main side; second switch terminal on the second main side; a plurality of electronic switching devices arranged on the first main side, each electronic switching device comprising a first controlled terminal and a second controlled terminal; wherein the first controlled terminals are arranged around the first switch terminal and are connected to the first switch terminal via a respective electrically conductive connection; and wherein each second controlled terminal is connected to a respective through connection to connect the second switch terminal; wherein at least two second controlled terminals are connected with each other through the respective through connection; and a plurality of further electronic switching devices arranged on the second side, each further electronic switching device comprising a first controlled terminal and a second controlled terminal; wherein each first controlled terminal is connected to the second switch terminal via a respective further electrically conductive connection, wherein the further electrically conductive connections have substantially the same length.

* * * * *